United States Patent [19]

Goodale et al.

[11] 4,194,026

[45] Mar. 18, 1980

[54] METHOD OF MANUFACTURING TEXTURED FOAM COATINGS AND MATERIALS

[75] Inventors: Clark W. Goodale, Simi Valley; Charles W. Morgan, Rolling Hills; Albert L. Rhoton, Cypress, all of Calif.; David F. McNeil, Hickory, N.C.

[73] Assignee: United Foam Corporation, Compton, Calif.

[21] Appl. No.: 778,985

[22] Filed: Mar. 18, 1977

Related U.S. Application Data

[63] Continuation-in-part of Ser. No. 664,568, Mar. 8, 1976, abandoned.

[51] Int. Cl.$^2$ .......................... B05D 3/02; B05D 5/00
[52] U.S. Cl. .................................. 427/244; 427/264; 427/271; 427/278; 427/365; 427/373; 521/76
[58] Field of Search .............. 427/373, 244, 365, 369, 427/264, 271, 278; 264/DIG. 7, 45.4, 45.8; 260/2.5 B; 428/315, 306, 307, 320; 521/76

[56] References Cited

U.S. PATENT DOCUMENTS

| | | | |
|---|---|---|---|
| 2,862,834 | 12/1958 | Hiler | 427/373 X |
| 3,607,341 | 9/1971 | Goins et al. | 428/315 X |
| 3,615,972 | 10/1971 | Morehouse, Jr. et al. | 156/297 X |
| 3,649,324 | 3/1972 | Payne | 427/244 X |
| 3,755,518 | 8/1973 | Stastny et al. | 264/46 |
| 3,919,451 | 11/1975 | Levy et al. | 427/369 X |
| 4,006,273 | 2/1977 | Wolinski et al. | 260/25 B |
| 4,038,445 | 7/1977 | Robertson | 427/373 X |
| 4,049,848 | 9/1977 | Goodale et al. | 427/244 |

*Primary Examiner*—Evan K. Lawrence
*Attorney, Agent, or Firm*—Blakely, Sokoloff, Taylor & Zafman

[57] ABSTRACT

A method of making textured foam coatings and materials is disclosed. A mixture of a curable frothed elastomeric emulsion composition and 20 pounds or less of thermally expandable beads to each 100 pounds of elastomeric composition is applied to a foam substrate and heated. During heating the plastic beads expand to produce a textured pebble-like coated elastomeric article.

31 Claims, 10 Drawing Figures

METHOD OF MANUFACTURING TEXTURED FOAM COATINGS AND MATERIALS

CROSS REFERENCE TO RELATED APPLICATIONS

This is a continuation-in-part application of our application Ser. No. 664,568 filed Mar. 8, 1976, now abandoned.

BACKGROUND OF THE INVENTION

1. Field of the Invention

This invention relates to the general fields of coatings and building materials, and more particularly to wall and ceiling coverings with a sprayed on acoustical type pattern for use in mobile homes, conventional homes, recreational vehicles, and the like, and a method of manufacturing of such coatings and materials.

2. Prior Art

Through the years, manufacturers of mobile homes have tried to develop construction methods and materials which would give the mobile home the "feel" and appearance of an "on site built home", and which would be able to withstand the physical stresses and distortions of moving the home from one location to another. Duplication of floor areas and windows is generally not difficult, as most "on site" floor coverings are directly usable, and window glass can be removed for transport, if necessary. However, the walls and ceiling of mobile homes typically have grooves or moldings where the material used to form the walls or ceiling is joined, markedly distinguishable from an on site built home.

Many on site built homes have seamless ceilings and walls which have a pattern on them. One such pattern is provided by a sprayed on ceiling, giving a pebbled appearance with a material resembling plaster and referred to as a "sprayed on acoustical pattern." Many attempts to produce this sprayed on acoustical pattern in mobile homes have been made without success. When a sprayed on acoustical ceiling of plaster is applied in a mobile home, the desired seamless appearance is produced, but when the mobile home is moved, the ceiling often cracks, necessitating the repair or replacement of the ceiling after each move.

Some manufacturers of modular homes (a home moved only once on a flatbed truck) have used a liquid plastic film material containing plastic chips to obtain a flexible seamless wall and ceiling covering. Because this system requires very expensive special preparation of the surface over which it is to be applied, and considerable skill for its installation, it is not well suited for the mobile home industry. Another disadvantage is that the ceiling produced is not sufficiently resistant to the stresses which are inherent in moving a mobile home from place to place. Thus, cracks and seams will appear after a move which detract from the appearance of the walls and ceiling.

Another prior art covering consists of a thin plastic film coated on one side with adhesive. The exposed side of the film has an appearance which approximates a shot acoustical ceiling. The covering is supplied in twelve foot wide continuous rolls which enables a seamless appearance to be achieved. The film, however, lacks any appreciable "self-leveling" capacity, and requires extensive preparation of the wall or ceiling prior to its application. (A film is self-leveling when the surface of the film bonded to the wall or ceiling is able to locally deform sufficiently to prevent any irregularities from appearing on the opposite exposed surface.) All irregularities in the wall or ceiling, e.g., seams, cracks, etc., have to be puttied, taped, and sanded to provide a smooth surface, as any flaw in the covered surface "telegraphs through" the film because of the small thickness of the film. Thus, each ceiling panel to be covered must be perfectly level with the adjacent panel, and each panel must be free of surface irregularities. Another major disadvantage of this material is that it cannot be repaired without the repair being readily detectable.

One prior art material provides the desired appearance, and because it utilizes a urethane foam backing material of significant thickness, is self-leveling. This material is manufactured by applying resin coating onto a sea sponge type urethane substrate, drying the coated substrate thus formed, and thereafter crushing the dried substrate to form a composite textured material. While the product so formed is highly suited for the intended use, the process by which it is formed, especially the crushing of the material to obtain the texture, is highly sensitive to various parameters which can be difficult to control.

Other methods of providing textured coatings are known in the prior art, such methods including the use of expandable polystyrene beads as is disclosed in U.S. Pat. No. 2,862,834. Other patents describing the fabrication of products having textured surfaces include U.S. Pat. Nos. 2,827,727; 3,502,539; 3,607,341; 3,615,972; 3,639,160; 3,649,324; 3,752,695; 3,755,518; 3,908,059 and 3,919,451. However none of these methods or products seem to have found their way into the construction industry, particularly the mobile and modular homes industry, in any substantial commercial quantities, and it is to this specific purpose to which the preferred embodiment of the present invention is directed.

SUMMARY OF THE INVENTION

The present invention deals with a method of manufacture of textured foam coatings and materials, which may be used for such purposes as acoustical wall and ceiling coverings as well as to cover any other walls where an attractive finish is desired. The coatings are manufactured using a frothable emulsion mixture having a main constituent of an elastomeric material and having dispersed therein expandable plastic beads more particularly, the method steps comprise (a) providing a mixture of a curable frothed elastomeric emulsion composition and 20 pounds or less of thermally expandable plastic beads to each 100 pounds of said elastomeric composition, said thermally expandable plastic beads having a diameter of at least approximately 0.5 millimeters; (b) uniformly distributing said mixture over one surface of a flexible urethane foam sheet; and (c) heating said mixture to expand the plastic beads and to dry and cure the frothed elastomeric emulsion composition to form a textured pebble-like elastomeric coating. The term "elastomeric" as it is used herein refers to natural or synthetic high polymers having unique properties of deformation (elongation of yield under strain) and elastic recovery after curing or cross-linking or vulcanization which, when used with a urethane substrate sheet, or the like, will allow the beads and polymer to form a flexible and yielding composite material that will not crack or peel when rolled for storage or when subjected to moving conditions such as when the material is used as a ceiling or wall material in a mobile or modular home. According to the process of this invention the uncured elastomeric mixture is uniformly dispersed over the surface of a substrate such as a urethane foam, and is then heated in an oven. During the application of heat the elastomeric material is dryed, cured and optionally, depending on the material, may be cross-linked, and the expandable beads are caused to expand, thereby producing a textured pebble-like coating on the substrate. The product resulting from the use of the urethane foam substrate provides a self-leveling acoustical wall and ceiling covering, ideal for use in mobile and modular homes, recreational vehicles, boats, conventional on-site construction, and as a lining in motor vehicles.

The preferred elastomeric resin materials which have been found to give excellent results are acrylic, styrene-butadiene, nitrile rubber (e.g., acrylonitrite-butadiene-styrene); vinyl chloride-acrylic; vinylidene chloride-vinyl chloride; neoprene latex; and natural rubber.

Alternate methods of manufacture include a dispersion of the frothed elastomeric emulsion over the surface of a substrate, and the subsequent dispersion of the expandable plastic beads thereover prior to the heating of the composite material. Since the resulting texture and appearance of the free surface is primarily a product of the expandable plastic beads and elastomeric froth, the desired results are achieved using substrates having a relatively smooth or flat surface, and for that matter the invention is applicable to the coating of smooth surfaces or the fabrication of coatings separate and apart from any substrate. Also, highly textured substrates such as urethane foams commonly known as "sea sponge" may contribute to the resulting textured surface but are not necessary for the present invention. It has been found that the use of a final coating (sometimes referred to as a "lock coat") is highly desirable to insure that the expanded beads remain affixed to the final product. Such lock coat is normally sprayed onto the material after the beads and elastomeric foam have been initially cured. Crushing subsequent to curing of the components, by such means as rollers, may be used to diminish the glossiness of the resulting textured surface.

DESCRIPTION OF THE PREFERRED EMBODIMENTS

The present invention is comprised of materials and methods of manufacture of materials (and coatings) which have a random, highly textured characteristic similar in appearance to a sprayed on acoustical pattern. Thus, the most important aspects of the present invention are the textured and attractive appearance of a free surface of the resulting material, as opposed to its bulk properties (other than the self leveling capacity) and the ease of manufacture as formed in accordance with the invented methods comprising methods for disposing expandable plastic beads and a mixture of elastomeric foam constituents (e.g., a frothable elastomeric emulsion composition) over a surface and heating these materials to expand the plastic beads and to dry, cure and, if desired, cross-link the elastomeric froth. The result of these methods or processes is to create a random, highly textured characteristic at the exposed free surface simulating a sprayed on acoustical pattern. By suitable control of the processes disclosed herein, textured surfaces of relatively uniform altitude, substantially free of local projections or valleys which exceed the characteristic texture dimensions may be easily manufactured. While the materials (coatings) so formed may themselves be used for various purposes, it is preferable to dispose the expandable plastic beads and the elastomeric constituents onto a part to be coated or onto a suitable substrate.

Any suitable material may be coated or used as substrate, with the primary limitations thereon being that such materials must be compatible with the various constituents of the textured coatings to be formed, both in the uncured and cured states, and must also be compatible with the elevated temperatures used for drying and curing. As shall subsequently be seen, one highly suitable and preferred substrate is polyurethane foam, with the resulting coated product providing an excellent material to use in mobile and modular homes, recreational vehicles, boats and other construction for simulating sprayed on acoustical ceilings, as the resulting product has both the desired aesthetic character and self-leveling capabilities. Accordingly, in the description to follow, the present invention process and the materials so manufactured shall be specifically described with respect to a textured material for use in mobile and modular homes to simulate sprayed on acoustical ceilings, it being understood that the methods may be directly applied to the formation of coatings, the coating of articles, and the manufacture of composite materials, all in accordance with the present invention.

Figure 1:
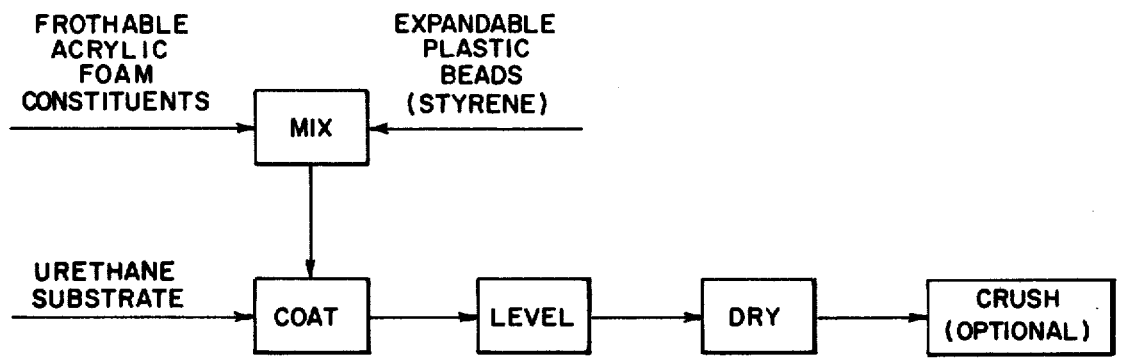
FIG. 1 is a block diagram illustrating the preferred process for manufacture of a self-leveling acoustical wall and ceiling covering.

Now referring to FIG. 1, a block diagram of the preferred method of forming a textured material having a polyurethane substrate may be seen. In this method of practice of the invention, frothable elastomeric constituents and expandable plastic beads (preferably expandable styrene beads) are mixed, preferably sufficiently to provide a controlled extent of frothing. This frothed mixture is then used to coat one surface of a urethane foam sheet, typically by applying (distributing) a slight excess of the mix to the sheet and leveling the mix. The urethane substrate with the froth mix coating thereon is then heated in an oven to dry the coating and to cure and/or cross-link the froth, thereby providing one form of the present invention. If desired, the resulting product may be crushed, such as by passing the product through a pair of rollers. The crushing of the product has little affect on the texture thereof, but provides a duller (less glossy) appearance which may be preferred in certain applications. The crushing of course is optional, depending upon the desired result and intended use for the product.

Figure 2:
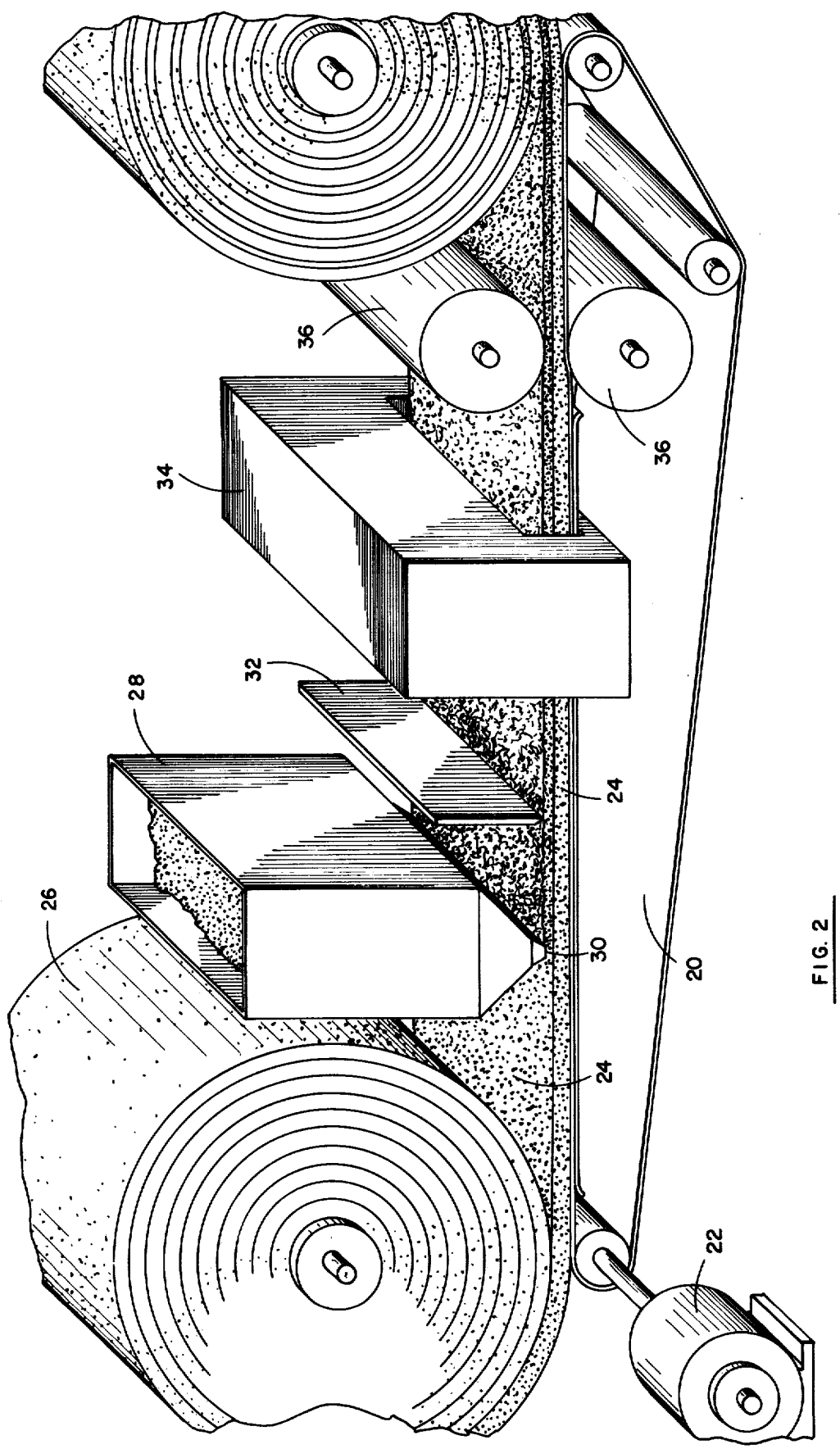
FIG. 2 is a schematic representation for automatic equipment for carrying out the process of FIG. 1.

Now referring to FIG. 2, a schematic representation of semi-automatic equipment for the substantially continuous manufacture of the simulated acoustic ceiling product may be seen. In this system a continuous belt 20 driven by a motor assembly 22 is used to remove a sheet of polyurethane foam 24 from a supply roll 26 and to convey the sheet through the system. The mixture of frothable constituents and expandable plastic beads is contained in the reservoir 28, and is dispensed in a continuous sheet 30 onto the foam 24 passing therebelow. While the dispensing of the mix may be relatively uniform, it is preferable to provide some form of additional leveling such as a doctor blade or metal plate 32 disposed in a fixed position above the conveyor. After leveling, the coated urethane foam passes through an oven 34 having a time temperature relationship to properly dry, cure and/or cross-link the uncured elastomeric froth and to expand the plastic beads. Finally, as previously mentioned, if desired, the cured product may be passed between a pair of rollers 36 to dull the surface as desired. In this regard excellent results have been achieved utilizing rollers having a diameter of approximately 9 to 10 inches, and providing a pressure on the product in the range of approximately 5 to 80 pounds per linear inch (e.g., per inch of width of the product).

Various elastomeric materials have been found which achieve the desired result. The presently preferred elastomeric material is an acrylic latex coating which has the basic formulation set forth below in Example I:

EXAMPLE I

| COMPONENTS | ACRYLIC LATEX | | |
|---|---|---|---|
| | PARTS BY WEIGHT | WEIGHT % | PARTS SOLIDS CONTENT* |
| A polymeric emulsion composition in water based on ethyl acrylate, acrylonitrile and methylolacrylamide (for example, RHOPLEX TR-621, manufactured by Rohm and Haas Company) | 100 | 43.02 | 55.0 |
| Sodium salts of a copolymer of maleic anhydride and diisobutylene (for example, TAMOL 731, manufactured by Rohm and Haas Company) | 1.6 | 0.7 | 0.4 |
| Titanium dioxide (rutile) for example, TITANOX RA-45 from Titanium Pigments Corp. of America | 12.5 | 5.38 | 12.5 |
| Aluminum hydrate | 55 | 23.67 | 55.0 |
| Melamine formaldehyde resin (for example, AEROTEX M-3 manufactured by American Cyanamid) | 2.3 | 0.99 | 1.8 |
| Water emulsion copolymer of ethyl acrylate and methacrylic acid (for example ACRYSOL ASE-60 manufactured by Rohm and Haas Company) | 2.9 | 1.25 | 0.8 |
| Ammonium hydroxide (28%) | 2.0 | 0.86 | — |
| Ammonium stearate | 7.0 | 3.01 | 2.3 |
| Water | 49.1 | 21.12 | — |
| Total | 232.4 | 100.00 | 127.8 |

*Water and the ammonia (NH₃) gas given off by the ammonium hydroxide constitute all the non-solid portion of the above formulation of Example I.

In the above-described preferred formulation, the sodium salt of the copolymer of maleic anhydride and diisobutylene are dispersants for the pigment; titanium dioxide is a pigment to give opacity and whiteness; aluminum hydrate is primarily for flame retardance; the melamine formaldehyde resin is a cross-linker for the polymeric composition; the emulsion copolymer of ethyl acrylate and methacrylic acid is a thickener; the ammonium hydroxide is used primarily for pH adjustment (e.g., above 9.5); and the ammonium stearate helps soften and stabilize the forth while acting as a frothing agent.

Other acrylic resins may be used. Suitable acrylic resins for the coating may be formed from resins having about 0.3-1.5% itaconic acid; 40-70% ethyl acrylate; 2-6% butyl acrylate and 0-7% acrylonitrile.

In addition to the preferred acrylic elastomeric materials, the following alternate elastomeric resin materials may also be used with satisfactory results: styrene-butadiene copolymer latex; acrylonitrile-butadiene-styrene terpolymer; vinyl chloride-acrylic copolymer; vinylidene chloride—vinyl chloride copolymer; neoprene latex (e.g. a copolymer of chloroprene and methacrylic acid or a homopolymer of chloroprene); and, natural rubber latex. Examples II–VIII, below set forth certain preferred alternate formulations using various elastomeric resin materials and suitable additives which can be used with the expandable beads in the invented process to obtain the desired textured composite material.

The following are the presently preferred alternate elastomeric material formulations:

EXAMPLE II

| COMPONENTS | STYRENE-BUTADIENE COPOLYMER LATEX (SBR OR S TYPE ELASTOMER) | | |
|---|---|---|---|
| | PARTS BY WEIGHT | WEIGHT % | PARTS SOLIDS CONTENT* |
| A polymeric emulsion composition in water based on styrene and butadiene. The ratio of these would be nominally 45% styrene and 55% butadiene. (for example, XD-3004.200 latex manufactured by Dow Chemical Co.) | 100.0 | 50.67 | 50.00 |
| Sodium salts of a copolymer of maleic anhydride and diisobutylene (for example, Tamol 731, manufactured by Rohm & Haas Co.) | 3.00 | 1.52 | .75 |
| Titanium dioxide (for example, Titanox R900 from E. I. Dupont) | 14.00 | 7.09 | 14.00 |
| Aluminum trihydrate | 33.35 | 16.90 | 33.35 |
| Melamine formaldehyde resin (for example, Aerotex M-3, manufactured by American Cyanamid) | 4.00 | 2.03 | 3.20 |
| Water emulsion copolymer of ethyl acrylate and methacrylic acid (for example, Acrysol ASE60 manufactured by Rohm & Haas Co.) | 1.50 | .76 | .42 |
| Ammonium stearate | 10.00 | 5.07 | 3.00 |
| Water | 31.50 | 15.96 | -0- |
| Total | 197.35 | 100.00 | 104.72 |

*Water constitutes all the non-solid portion of the above formulation of Example II.

In the above-described preferred emulsion formulation, the sodium salt of the copolymer of maleic anhydride and diisobutylene are dispersants for the pigment; titanium dioxide is a pigment to give opacity and whiteness; aluminum trihydrate is primarily for flame retardance; the melamine formaldehyde resin is a cross-linker for the polymeric composition; the emulsion copolymer of ethyl acrylate and methacrylic acid is a thickener; and the ammonium stearate helps soften and stabilize the froth while acting as a frothing agent.

EXAMPLE III

| COMPONENTS | ACRYLONITRILE-BUTADIENE-STYRENE TERPOLYMER: (NITRILE RUBBER) | | |
|---|---|---|---|
| | PARTS BY WEIGHT | WEIGHT % | PARTS SOLIDS CONTENT* |
| A polymeric emulsion composition in water based on acrylonitrile, butadiene and styrene. The polymer composition is nominally stryene 7%, acrylonitrile 30%, butadiene 62% (for example, Hycar 1572x45 Latex, manufactured by B. F. Goodrich Chemical Co.) | 100.0 | 45.45 | 50.00 |
| Sodium salts of a copolymer of maleic anhydride and diisobutylene (for example, Tamol 731, manufactured by Rohm & Haas Co.) | 3.00 | 1.37 | .75 |

-continued

| ACRYLONITRILE-BUTADIENE-STYRENE TERPOLYMER: (NITRILE RUBBER) | | | |
|---|---|---|---|
| COMPONENTS | PARTS BY WEIGHT | WEIGHT % | PARTS SOLIDS CONTENT* |
| Titanium dioxide (rutile) (for example, Titanox RA-45 from Titanium Pigments Corp. of America | 14.00 | 6.36 | 14.00 |
| Aluminum Trihydrate | 55.00 | 25.00 | 55.00 |
| Melamine formaldehyde resin (for example, Aerotex M-3 manufactured by American Cyanamid) | 6.00 | 2.73 | 4.80 |
| Water emulsion copolymer of ethyl acrylate and methacrylic acid (for example, Acrysol ASE-60 manufactured by Rohm & Haas Co.) | 3.00 | 1.36 | .84 |
| Ammonium stearate | 6.00 | 2.73 | 1.80 |
| Water | 33.00 | 15.00 | -0- |
| Total | 220.00 | 100.00 | 127.9 |

*Water constitutes all the non-solid portion of the above formulation of Example III.

In the above-described preferred emulsion formulation, the sodium salts of the copolymer of maleic anhydride and diisobutylene are dispersants for the pigment; titanium dioxide is a pigment to give opacity and whiteness; aluminum trihydrate is primarily for flame retardance; the melamine formaldehyde resin is a cross-linker for the polymeric composition; the emulsion copolymer of ethyl acrylate and methacrylic acid is a thickener; and the ammonium stearate helps soften and stabilize the froth while acting as a frothing agent.

EXAMPLE IV

| VINYL CHLORIDE-ACRYLIC COPOLYMER | | | |
|---|---|---|---|
| COMPONENTS | PARTS BY WEIGHT | WEIGHT % | PARTS SOLIDS CONTENT* |
| A copolymer emulsion composition in water of vinyl chloride and acrylic latex of approximately 50% vinyl chloride and 50% acrylic., (for example, Geon 460xl Latex manufactured by B. F. Goodrich Chemical Co.) | 100.00 | 62.50 | 50.00 |
| Sodium salts of copolymer of maleic anhydride and diisobutylene (for example, Tamol 731 manufactured by Rohm & Haas Co.) | 3.00 | 1.88 | .75 |
| Titanium dioxide (rutile) (for example, Titanox R900 from E. I. DuPont Co.) | 14.00 | 8.74 | 14.00 |
| Water emulsion copolymer of ethyl acrylate and methacrylic acid (for example, Acrysol ASE-60 manufactured by Rohm & Haas Co.) | 3.00 | 1.88 | .84 |
| Ammonium hydroxide | 4.00 | 2.50 | — |
| Ammonium Stearate | 6.00 | 3.75 | 1.80 |
| Water | 30.00 | 18.75 | -0- |
| Total | 160.00 | 100.00 | 67.39 |

*Water and the ammonia (NH₃) gas given off by the ammonium hydroxide constitute all the non-solid portion of the above formulation of Example IV.

In the above-described preferred emulsion formulation, the sodium salt of the copolymer of maleic anhydride and diisobutylene are dispersants for the pigment; titanium dioxide is a pigment to give opacity and whiteness; the emulsion copolymer of ethyl acrylate and methacrylic acid is a thickener; the ammonium hydroxide is used primarily for pH adjustment (e.g., above 9.5); and the ammonium stearate helps soften and stabilize the froth while acting as a frothing agent.

EXAMPLE V

| COMPONENTS | PARTS BY WEIGHT | WEIGHT % | PARTS SOLID CONTENT* |
|---|---|---|---|
| VINYLIDENE CHLORIDE-VINYL CHLORIDE COPOLYMER: | | | |
| A copolymer emulsion composition in water of vinylidene chloride and vinyl chloride latex. The nominal composition is 90% vinylidene chloride, 10% vinyl chloride. (for example, Geon 660xl Latex manufactured by B. F. Goodrich Chemical Co.) | 100.00 | 62.50 | 51.00 |
| Sodium salts of a copolymer of maleic anhydride and diisobutylene (for example, Tamol 731, manufactured by Rohm & Haas Co,) | 3.00 | 1.88 | .75 |
| Titanium dioxide (rutile) (for example, Titanox R900 manufactured by E. I. DuPont Co.) | 14.00 | 8.75 | 14.00 |
| Water emulsion copolymer of ethyl acrylate and methacrylic acid (for example Acrysol ASE-60 manufactured by Rohm & Haas Co.) | 3.00 | 1.88 | .84 |
| Ammonium stearate | 6.00 | 3.74 | 1.80 |
| Ammonium hydroxide | 4.00 | 2.50 | — |
| Water | 30.00 | 18.75 | -0- |
| Total | 160.00 | 100.00 | 68.39 |

*Water and the ammonia ($NH_3$) gas given off by the ammonium hydroxide constitute all the non-solid portion of the above formulation of Example V.

In the above-described preferred formulation, the sodium salt of the copolymer of maleic anhydride and diisobutylene are dispersants for the pigment; titanium dioxide is a pigment to give opacity and whiteness; the emulsion copolymer of ethyl acrylate and methacrylic acid is a thickener; the ammonium hydroxide is used primarily for pH adjustment (e.g., above 9.5); and the ammonium stearate helps soften and stabilize the foam while acting as a foaming agent.

EXAMPLE VI

| COMPONENTS | PARTS BY WEIGHT | WEIGHT % | PARTS SOLIDS CONTENT* |
|---|---|---|---|
| NEOPRENE LATEX (COPOLYMER OF CHLOROPRENE AND METHACRYLIC ACID | | | |
| Copolymer emulsion in water of chloroprene and methacrylic acid latex. (for example Neoprene Latex 101 manufactured by E. I. DuPont Co.) | 100.00 | 57.55 | 46.00 |
| Malamine formaldehyde resin (for example Aerotex M-3 manufactured by American Cyanamid | 5.00 | 2.88 | 4.00 |
| Aluminum trihydrate | 25.00 | 14.39 | 25.00 |
| Tricresyl Phosphate | 5.00 | 2.88 | 5.00 |
| Sodium sulfate of higher fatty alcohols (for example, Aquarex WAQ manufactured by E. I DuPont Co.) | 3.00 | 1.72 | .30 |
| Disodium N-octodecyl sulfosuccinamate, 35% active, (for example, Aerosol 18 manufactured by American Cyanamid) | 2.50 | 1.44 | .88 |
| Sodium salt of polyacrylic acid, 12-13% active, (for example, Acrysol GS manufactured by Rhom & Haas Co.) | 5.00 | 2.88 | .62 |
| PIGMENT DISPERSION | | | |

-continued

| COMPONENTS | PARTS BY WEIGHT | WEIGHT % | PARTS SOLIDS CONTENT* |
|---|---|---|---|
| NEOPRENE LATEX (COPOLYMER OF CHLOROPRENE AND METHACRYLIC ACID | | | |
| Zinc oxide | 2.50 | | 2.50 |
| Antimony oxide | 2.00 | | 2.00 |
| Hindered phenol (or paraphenylenediamine) (for example, WINGSTAY-L manufactured by Goodyear Tire and Rubber Co.) | 1.20 | | 1.20 |
| Sodium salts of copolymer of maleic anhydride and diisobutylene (for example, TAMOL 73 manufactured by Rohm & Haas Co.) | 2.40 | | .60 |
| Titanium dioxide | 5.00 | | 5.00 |
| Water | 15.15 | | -0- |
| Pigment Dispersion Total | 28.25 | 16.26 | 11.30 |
| Total | 173.75 | 100.00 | 93.10 |

*Water constitutes all the non-solid portion of the above formulation of Example VI.

In the above-described preferred emulsion formulation, the sodium salts of the copolymer of maleic anhydride and diisobutylene and the sodium sulfate of the higher fatty alcohols are dispersants for the pigment; titanium dioxide is a pigment to give opacity and whiteness; aluminum trihydrate is primarily for flame retardance; the melamine formaldehyde resin is a cross linker for the polymeric composition; tricresyl phosphate reduces the flammability and softens the film; the sodium salt of polyacrylic acid is a thickening agent; disodium N-octodecyl sulfosuccinamate is a foaming aid; zinc oxide is an accelerator of cure; antimony oxide also reduces flammability; and hindered alcohol (or paraphenylenediamine) improves the aging properties of the finished product.

EXAMPLE VII

| COMPONENTS | PARTS BY WEIGHT | WEIGHT % | PARTS SOLID CONTENT |
|---|---|---|---|
| NEOPRENE LATEX-HOMOPOLYMER OF CHLOROPRENE | | | |
| Homopolymer emulsion in water of chloroprene (for example, Neoprene Latex 357 manufactured by E. I. DuPont Co.) | 100.00 | 48.77 | 61.00 |
| Aluminum trihydrate | 25.00 | 12.19 | 25.00 |
| Sodium sulfate of higher fatty alcohol (for example, Aquarex WAQ manufactured by E. I. DuPont Co.) | 3.00 | 1.46 | .30 |
| Disodium N-octodecyl sulfosuccinamate, 35% active, (for example, Aerosol 18 manufactured by American Cyanamid) | 3.00 | 1.46 | 1.05 |
| Sodium salt of polyacrylic acid, 12—13% active, (for example, Acrysol GS manufactured by Rohm & Haas Co.) | 6.00 | 2.93 | .75 |
| Water | 30.00 | 14.63 | -0- |
| PIGMENT DISPERSION | | | |
| Zinc oxide | 3.00 | | 3.00 |
| Antimony oxide | 2.50 | | 2.50 |
| Hindered phenol (or paraphenylenediamine) (for example, WINGSTAY-L manufactured by Goodyear Tire and Rubber Co.) | 1.50 | | 1.50 |
| Sodium salts of copolymer of maleic anhydride and diisobutylene (for example, TAMOL 73 manufactured by Rohm & Haas Co.) | 4.00 | | 1.00 |
| Titanium oxide | 6.00 | | 6.00 |
| Thiocarbanilide or N, N' diphenylthiourea, 33% active (for example, available from Monsanto | | | |

| NEOPRENE LATEX-HOMOPOLYMER OF CHLOROPRENE | | | |
|---|---|---|---|
| COMPONENTS | PARTS BY WEIGHT | WEIGHT % | PARTS SOLID CONTENT |
| Chemical Co.) | 3.69 | | 1.22 |
| Water | 17.36 | | -0- |
| Pigment Dispersion Total | 38.05 | 18.56 | 15.22 |
| Total | 205.05 | 100.00 | 103.32 |

*Water constitutes all the non-solid portion of the above formulation of Example VII.

In the above-described preferred emulsion formulation, the sodium salts of the copolymer of maleic anhydride and diisobutylene and the sodium sulfate of higher fatty alcohol are dispersants for the pigment; titanium dioxide is a pigment to give opacity and whiteness; aluminum trihydrate is primarily for flame retardance; tricresyl phosphate improves the flammability and softens the polymer; disodium N-octodecyl sulfosuccinamate stabilizes the foam while acting as a foaming agent; the sodium salt of polyacrylic acid is a thickening agent; antimony oxide reduces flammability; the hindered alcohol (or paraphenylenediamine) improves the aging properties of the finished product; and thiocarbanilide is a cross-linking accelerator.

EXAMPLE VIII

| NATURAL RUBBER LATEX | | | |
|---|---|---|---|
| COMPONENTS | PARTS BY WEIGHT | WEIGHT % | PARTS SOLID CONTENT* |
| Centrifuged Natural Rubber Latex, 62% solids | 100.00 | 47.25 | 62.00 |
| Aluminum trihydrate | 60.00 | 33.52 | 60.00 |
| Sodium sulfate of higher fatty alcohol (for example, Aquarex WAQ manufactured by E. I. DuPont Co.) | 5.00 | 2.36 | 5.00 |
| Disodium N-octodecyl sulfosuccinamate, 35% active, (for example, Aerosol 18 manufactured by American Cyanamid) | 4.00 | 1.90 | 1.40 |
| Methylcellulose | 10.00 | 4.73 | .50 |
| PIGMENT DISPERSION | | | |
| Zinc oxide | .60 | | .60 |
| Antimony oxide | 2.50 | | 2.50 |
| zinc dibutyl-dithiocarbamate for example, available as Butyl Zimate from R. T. Vanderbilt Co., Inc.) | .10 | | .10 |
| Sulfur | 1.10 | | 1.10 |
| Hindered phenol or parapheynylenediamine (for example, Wingstay-L manufactured by Goodyear Tire and Rubber Co.) | 1.50 | | 1.50 |
| Sodium salts of copolymer of maleic anhydride and diisobutylene (for example, TAMOL 73 manufactured by Rohm & Haas Co.) | 5.00 | | 1.25 |
| Titanium Dioxide | 6.00 | | 6.00 |
| Pigment Dispersion Total | 32.62 | 15.41 | 13.05 |
| Total | 211.62 | 100.00 | 141.95 |

*Water constitutes all the non-solid portion of the above formulation of Example VIII.

In the above-described preferred latex formulation, the sodium salts of the copolymer of maleic anhydride and diisobutylene and the sodium sulfate of higher fatty alcohol are dispersants for the pigment; titanium dioxide is a pigment to give opacity and whiteness; aluminum trihydrate is primarily for flame retardance; disodium N-octodecyl sulfosuccinamate is a wetting agent which stabilizes and aid in the foaming; antimony oxide reduces the flammability; zinc dibutyldithiocarbamate and Zinc oxide speed the cure of the system; sulfur is a cross-linking agent; hindered phenol improves the long term aging properties of the product; and methylcellulose is a thickener.

It should be understood that the above-described preferred compositions could contain pigment colors (other than white) and other additives could be added to or substituted to obtain the desired properties. In general the elastomeric compositions used have about 40% to 55% solids content by weight.

The expandable plastic beads used in the preferred method are expandable polystyrene beads having diameters in the range of about 0.5 to 2.0 millimeters (preferably about 0.75 to 1.2 millimeters) and sold by The Dow Chemical Company of Midland, Michigan under their trademark "VORASPAN No. 125." Such beads, as used in the present invention, normally expand up to about 8 times the original diameter. The emulsion of the elastomeric composition and the beads are vigorously mixed until a foam or froth is produced having a substantially reduced density over the unfrothed constituents. It has been found that while the exact coating appearance and characteristic will depend upon the mix, etc. used, useful coatings are readily obtained using the expandable styrene beads in the range of 3 lbs. to 20 lbs. per 100 lbs. of frothable foam constituents, with the range of 7.5 lbs. to 15 lbs. per 100 lbs. of frothable foam being preferred. The specific manner of mixing the constituents including the plastic beads is generally not critical. Therefore, the frothable foam constituents may be mixed prior to the inclusion of the expandable plastic beads, the plastic beads may be mixed directly with the foam constituents in the compounding process, or by metering the plastic beads into the frothable mix at any point in the frothable mix metering system. In any event, for the ranges specified it has been found desirable to froth (vigorously mix) to provide a density of the foam compound and plastic beads in the range of 140 grams to 260 grams per liter of mix. The resulting froth is readily handled and fairly easily dispensed and leveled, preferably to provide a coverage per unit area in the range of 20 grams to 70 grams of mix per square foot.

The urethane foam on which the frothed mix is applied may be substantially any regular flexible polyurethane foam, as the texture of the free surface is primarily (though not exclusively) a product of the coating materials and processes of the present invention rather than a direct "print through" of the substrate surface. (The term "urethane foam" as used herein is meant to include homopolymers and copolymers of flexible urethane as may be found in the Modern Plastics Encyclopedia, Vol. 52, No. 10A, pages 120–121 [McGraw Hill 1975]). However, for considerations of support, self leveling characteristics, etc., it has been found desirable to utilize a urethane foam having a thickness in the range of ⅛" to 1" and having a density in the range of 1 lb. per cubic foot to 6 lbs. per cubic foot, with a density of approximately 1.5 lbs. per cubic foot being preferred. In general, conventional urethane foams may be used, though if desired "sea sponge" foam or double cell foams can be used to give a more textured appearance. (See Journal of Cellular Plastics, Vol. 11, No. 3, May/June 1975 published by Technomic Publishing Co. for a typical composition of sea sponge. See also Pages 10 and Page 24 of Glossary of Urethane Industry Terms published by the Martin Sweets Company, Inc. for definitions of "buckshotting" and "double cells" which are characteristic of sea sponge type materials). Similarly, other materials such as other flexible cellular materials may be used if desired, provided such materials are compatible with at least the lower temperatures useable in curing the constituents of the mix and expanding the plastic beads. Some other suitable flexible materials, such as natural or plastic spone, neoprene, etc. could possible be used.

The time-temperature schedule for the curing of the elastomeric material may vary depending upon preference and the temperature capabilities of the materials and/or substrate used. It has been found that curing temperatures of about 200° F. to about 325° F. are suitable for the elastomeric materials and beads described hereinabove. Also, such elastomeric materials and beads can be expanded and cured in a time range of about 3 minutes to about 45 minutes.

By way of example, one preferred form of the invention utilizes 7.5 lbs. of the expandable beads per 100 lbs. of the frothable acrylic emulsion constituents, with the mixture being applied to a conventional urethane foam substrate in the amount of 40 grams per square foot. The acrylic coating, including the expandable beads was then dried in an oven at a temperature of 225° F. for a 30 minute period. However, higher temperatures such as 280° F. can be utilized if desired in order to reduce the amount of drying time required. For example, at a temperature of 280° F. a high quality product is obtained with a drying time range of 5 to 10 minutes. At temperatures of above about 325° F. the acrylic coating begins to discolor during the drying cycle, and therefore the drying temperatures should preferably be maintained below 325° F. Normally, in order to insure a suitable response of the materials to the heating cycle, a minimum temperature of approximately 225° F. is suggested. Thus, temperatures in the range of approximately 225° F. to 325° F. with curing times in the range of 4 to 40 minutes are preferred, with the longer cure times being associated with the lower temperatures in the stated ranges.

Figure 3:
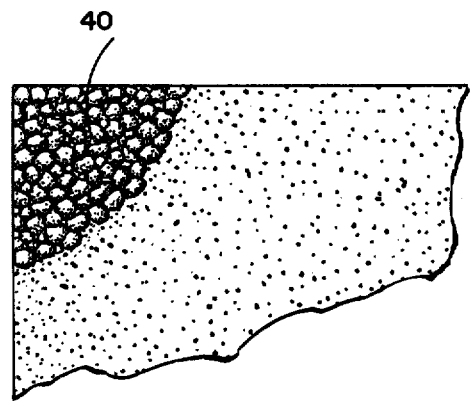
FIG. 3 is a top view of a second of the product fabricated in accordance with the process of FIG. 1 illustrating the texture of the free surface thereof.
Figure 4:
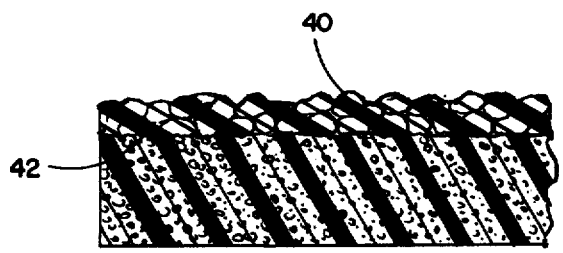
FIG. 4 is a cross section of a product made in accordance with the process of FIG. 1 illustrating the textured characteristic of the free surface and the relatively flat surface of the substrate.

Now referring to FIGS. 3 and 4, a face view of the textured surface and a cross section of the material of FIG. 3 illustrating the urethane foam substrate may be seen. The textured surface 40 is very similar to a sprayed-on acoustic ceiling surface, having a random pattern of relatively well controlled excursion. Of course, variance of the expandable bead size will vary the resulting "size" characteristic of the resulting textured pattern. Also it may be seen in FIG. 4 that while the coating itself is adherent to the urethane foam substrate, there is no substantial penetration of the substrate by the coating materials. It may also be seen in this figure that the coating itself develops the textured outer surface, as the urethane foam surface 42 is relatively flat compared to the outer textured surface 40 of the coating.

Figure 5:
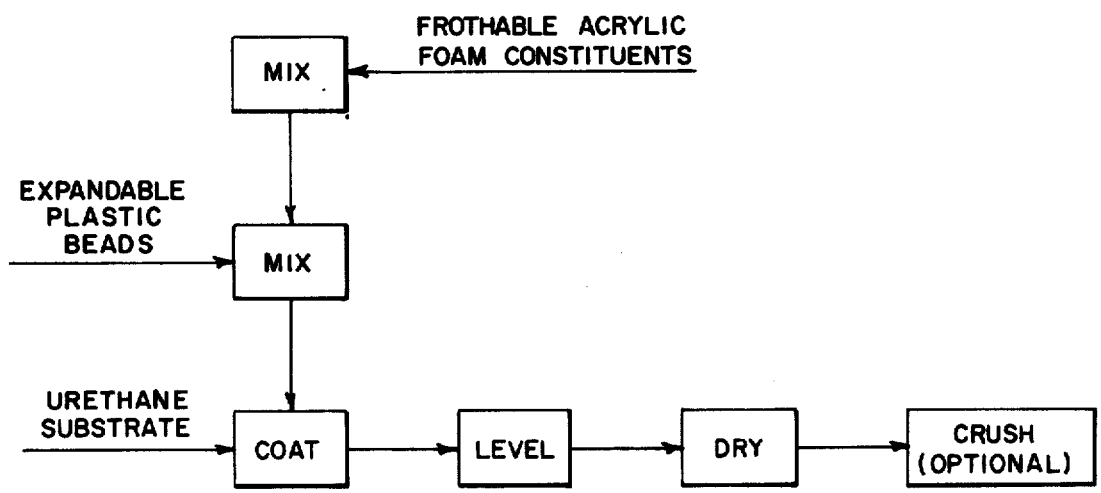
FIGS. 5 through 7 provide block diagrams for processes which may be used as an alternate to that shown in FIG. 1.
Figure 6:
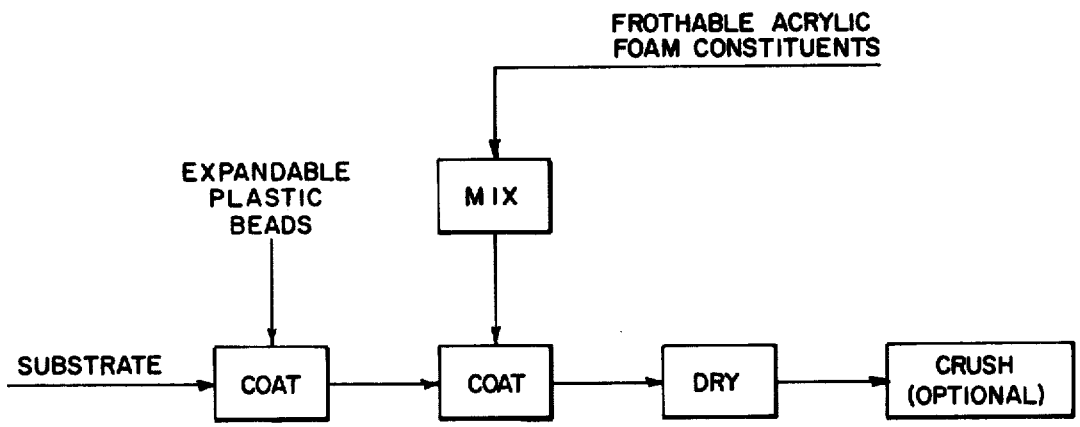
Figure 7:
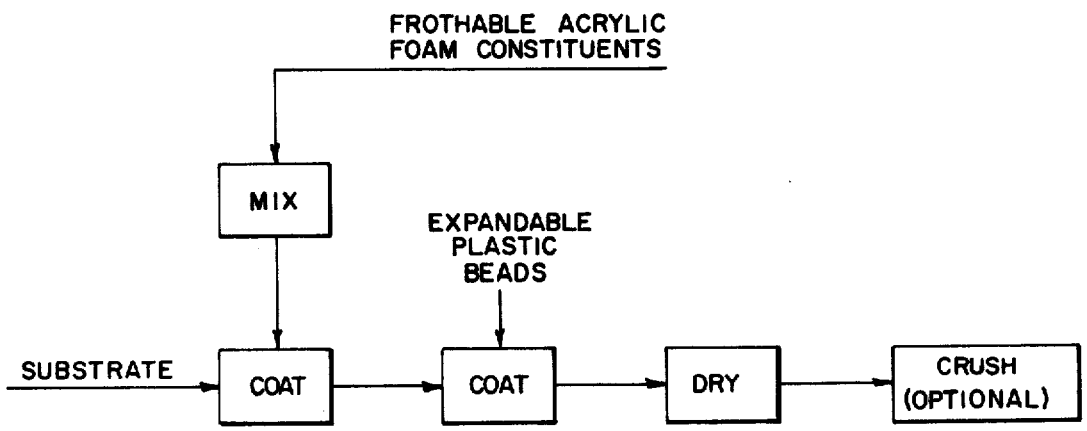

Now referring to FIGS. 5, 6 and 7, alternate methods for practicing the invention may be seen. These figures provide block diagrams for processes similar to that shown in FIG. 1, though alter the specific process in one or more ways. In particular, in FIG. 5, the frothable emulsion constituents are mixed and substantially frothed before the expandable beads are added. While it might seem that the frothable constituents would be more easily frothed before the inclusion of the plastic beads, it has been found that frothing is not deterred by the presence of the plastic beads, and accordingly the simultaneous mixing of all ingredients for the coating as shown in FIG. 1 and illustrated with respect to FIG. 2 is actually preferred. In the system of FIG. 6 the expandable plastic beads are first dispersed on the substrate, and then the foam froth is disposed thereover. This is the least preferred method, as the resulting adhesion between the coating and the urethane foam substrate may be adversely affected. In the system of FIG. 7, the froth is first dispersed over the substrate, and then the expandable plastic beads uniformly sprinkled thereover. This alternate method generally yields a textured composite material having the same general appearance as that previously discussed with respect to the methods of FIGS. 1 and 2. However it has been found that the adhesion of the expanded beads on the surface of the composite material is not as good as when the beads have been actually mixed into the frothed mixture prior to application to the urethane foam substrate. One method of alleviating the affects of the reduced adhesion, however, is to apply an excess of expandable beads to the coated surface, thereby allowing some of the excess number of beads to be lost from the material by poor adhesion without adversely affecting the over-all desired acoustical type textured pattern.

It will be appreciated from the foregoing description that the present invention method of producing a textured surface and particularly composite materials having a textured surface similar to a sprayed-on acoustic ceiling is generally not subject to or dependent upon critical processing steps. By way of specific example, in elastomeric lock coat composition 52 is applied to such composite material and the lock coat is then cured by passing it through a dryer at a temperature in the range of about 200° F. to 350° F.

Figure 9:
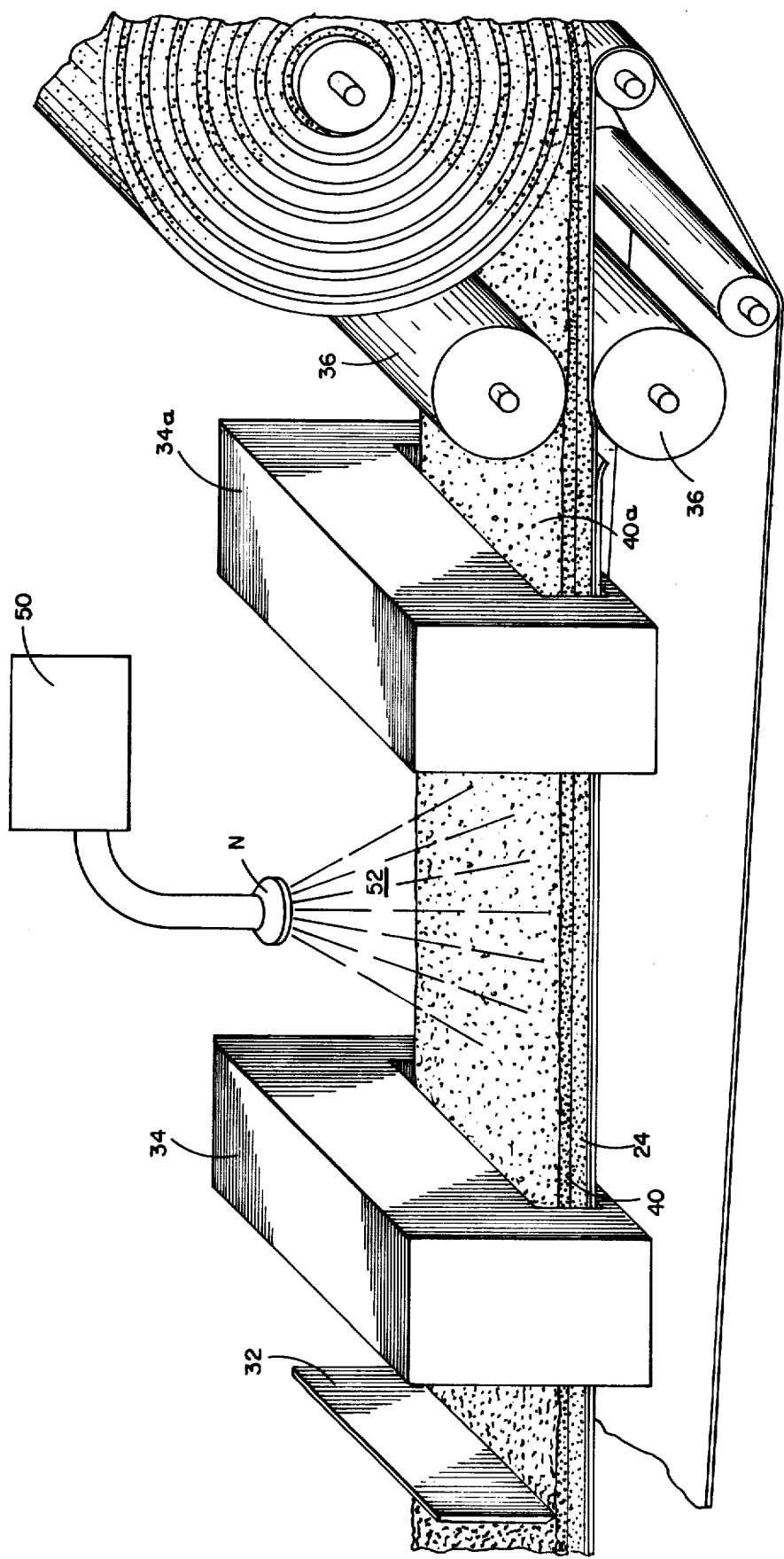
FIG. 9 is a partial schematic representation for automatic equipment showing the manner in which a final coat, or lock coat, can be applied for carrying out the process of FIG. 8.

FIG. 9 shows the manner in which a lock coat 40a can be formed on top of the textured surface 40. The cured composite material leaving the dryer 34 is passed under a nozzle N which sprays a suitable elastomeric coating 52 onto the top of the cured composite material. The lock coat composition 52 is supplied to the nozzle N by a conventional pump 50. The uncured elastomeric lock coated composite material is then sent into a dryer 34a, which is similar to dryer 34 previously described, and the elastomeric lock coat is cured.

A suitable lock coat for the acrylic resin material utilized in Example I is an acrylic lock coat which has the following preferred composition:

| COMPONENTS | PARTS BY WEIGHT | WEIGHT % | PARTS SOLID CONTENT* |
|---|---|---|---|
| A polymeric emulsion composition in water based on ethyl acrylate, acrylonitrile and (55% solids) methylolacrylamide (for example, RHOPLEX TR-621 manufactured by Rohm and Haas Company) | 75 | 87.21 | 41.25 |
| Sodium salts of a copolymer of maleic anhydride and diisobutylene (for example, TAMOL 731 manufactured by Rohm and Haas Company | 0.5 | 0.58 | 0.125 |
| Titanium dioxide (rutile) for example, TITANOX RA-45 from Titanium Pigments Corp. of America | 0.5 | 0.58 | 0.5 |
| Water | 10 | 11.63 | 0 |
| Total | 86.00 | 100.00 | 41.875 |

*Water constitutes all the non-solid portion of the lock coat formulation.

comparison to the prior art process wherein crushing an incompletely cured structure was required, the present invention is free of all such critical steps. The mixing of the various ingredients in the appropriate portions is routine in the art, and while uniform dispensing of materials over large surfaces can perhaps only be approached, it has been found that the direct application of the ingredients can be accomplished using a conventional dispensing apparatus, however, a simple doctor blade disposed above the transport system can be used to level the froth on the foam substrate. In this regard, while frothing is perhaps not mandatory, it is a very desirable aspect of the invention as it makes the dispensing and leveling operations easy to control, minimizes the material used, and enhances the finished product. Similarly, the curing times and temperatures do not have specific narrow or critical limits, as the curing is completed in one step so that excess time at the curing temperature is of little consequence.

Figure 8:
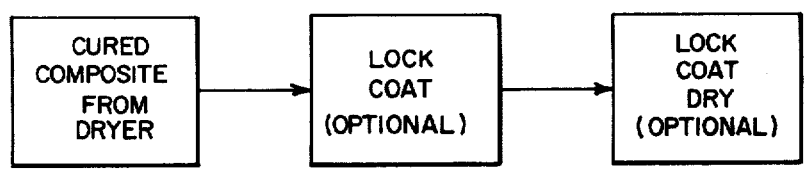
FIG. 8 is a block diagram illustrating an alternate preferred process step for manufacture of a self-leveling acoustical wall and ceiling material having a final coat, or lock coat, thereon.

An optional but preferred method for insuring that the beads remain adequately affixed to the final product involves further processing of the composite material which leaves the dryer 34 by depositing a final elastomeric coat or lock coat layer on top of the cured elastomeric coating containing the thermally expanded beads. The addition of a lock coat step is applicable to all the processes shown in FIGS. 1, 4, 5, 6 and 7. As shown in FIG. 8, once the cured, composite material having the textured surface 40 thereon leaves the dryer, an uncured If desired, the lock coat could include certain suitable fire retardant materials, such as, phosphate esters (e.g., Stauffer Company's FYROL FR2).

The lock coat is liquid in consistency and when sprayed onto the composite material it flows over the expanded beads and when cured thickens and ties the beads to the substrate. After the lock coat is cured there is little tendency for the beads to be rubbed off during subsequent handling. It should be understood that elastomeric type lock coats of styrene-butadiene, nitrile rubber, vinyl chloride-acrylic, vinylidene chloride-vinyl chloride, neoprene latex, natural rubber latex, etc., can also be used. Usually the lock coat 40a will contain the same basic elastomeric type resin material as is contained in the underlying textures surface 40 but such is not required.

Figure 10:
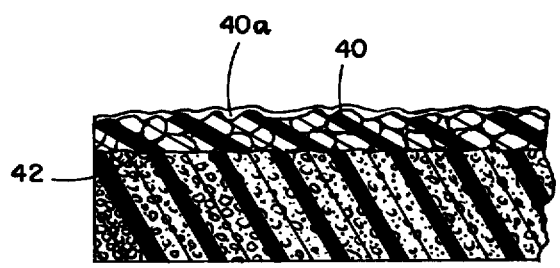
FIG. 10 is a cross section of a product made in accordance with the process of FIG. 8 and showing the final coat or lock coat thereon.

It has been found that a range of 2–18 grams (dry weight) of elastomeric lock coat per square foot is sufficient to achieve the desired results. Usually it is desirable to keep the lock coat as thin as possible to keep the desired textured appearance. Using the acrylic lock coat described above, excellent results are achieved using about 6 grams (dry weight) per square foot. The dry weight measurement is determined by weighing a square foot area of the dried material after it leaves dryer 34 and the same area of material after the lock coat has been dried in dryer 34a; the difference is the "dry weight." The composite material having the finished lock coat 40a thereon is shown in FIG. 10.

The present invention has been disclosed and described with particularity with respect to a composite material suitable for use as a wall and ceiling coating for mobile and modular homes and even conventional on-site construction. It should be understood, however, that the present invention material is flexible, damage resistant, and has good insulation properties making it useful also in other applications, such as in automobiles, recreational vehicles, and boats. while most applications are compatible with the use of a suitable substrate, the coating itself could be manufactured free of any substrate by the use of a teflon coated conveyor belt in the transport system of FIG. 2, and installed by fastening with adhesive directly to the surface desired to be coated. Also, the substrate material of the composite can consist of a suitable flexible material having the same general properties as the polyurethane foam sheet disclosed above. Preferably the substrate should be a foam type material so that it will exhibit the desired "self-leveling" characteristics described above in detail. It may also be possible to use flexible sheet materials such as cotton or synthetic fiber (e.g., acrylon) battings of about ¼" to ⅜" in thickness. While polystyrene expandable beads are used in the preferred composition, vinylidine chloride acrylonitrile beads can also be used and will give satisfactory results. Thus, while the present invention has been disclosed and described in detail herein with respect to its preferred use, that is, for wall and ceiling coverings, it will be understood by those skilled in the art that various changes in the practice of the invention or the application thereof may readily be made by those skilled in the art without departing from the spirit and scope of the invention.

We claim:

1. A method of producing a flexible material having a textured surface for use as an acoustical wall and ceiling covering comprising the steps of:
   (a) providing a mixture of a curable frothed elastomeric emulsion composition comprising 20 pounds or less of thermally expandable plastic beads to each 100 pounds of said elastomeric composition, said thermally expandable plastic beads having a diameter of at least approximately 0.5 millimeters;
   (b) uniformly distributing said mixture over one surface of a flexible urethane foam sheet; and
   (c) heating said mixture to expand the plastic beads and to dry and cure the frothed elastomeric emulsion composition to form a textured pebble-like elastomeric coating.

2. The method of claim 1 wherein the urethane foam sheet has a thickness in the range of one-eighth of an inch to one inch and a density in the range of one pound per cubic foot to six pounds per cubic foot.

3. The method of claim 1 wherein said elastomeric emulsion composition is dried and cured in an oven at a temperature of about 200° F. to 325° F.

4. The method of claim 1 comprised of the further steps of providing a layer of curable elastomeric composition over the flexible material formed in steps (a) through (c), and heating said layer to cure the elastomer.

5. The method of claim 1 wherein said mixture is frothed to a density in the range of one hundred forty grams per liter to two hundred sixty grams per liter prior to its distribution on the urethane foam.

6. The method of claim 5 further comprised of the step of crushing the resulting material after said curing.

7. The method of claim 1 in which said elastomeric emulsion composition is based on an elastomer selected from the group consisting of acrylic polymers, styrene-butadiene copolymers; nitrile rubber; vinyl chloride-acrylic copolymers; vinylidene chloride-vinyl chloride copolymers; neoprene; and natural rubber.

8. The method of claim 7 in which the curable elastomeric emulsion composition is an emulsion having a solids content of about 40% to 55% by weight.

9. The method of claim 1 wherein the elastomeric emulsion composition is an acrylic emulsion composition.

10. The method of claim 9 wherein step (a) comprises the step of providing the mixture of a frothed acrylic emulsion composition and expandable plastic beads in the proportions in the range of three pounds to twenty pounds of the expandable plastic beads to each one hundred pounds of acrylic emulsion composition, and step (b) comprises the step of distributing said mixture over one surface of a urethane foam sheet having a thickness in the range of one-eighth of an inch to one inch and a density in the range of one pound per cubic foot to six pounds per cubic foot.

11. The method of claim 10 wherein said expandable plastic beads are expandable polystyrene beads.

12. The method of claim 10 wherein said mixture is distributed in an amount in the range of twenty grams per square foot to seventy grams per square foot of said urethane foam sheet surface.

13. A method of producing a flexible composite wall and ceiling covering and the like having a textured pebble-like elastomeric outer surface comprising the steps of:
   (a) providing a mixture of a curable frothable water-based acrylic emulsion composition and thermally expandable polystyrene plastic beads having a diameter of about 0.5 to 2 millimeters, the mixture having proportions in the range of three pounds to twenty pounds of the expandable plastic beads to each one hundred pounds of acrylic emulsion composition, frothed to a density in the range of one hundred forty grams per liter to two hundred sixty grams per liter;
   (b) uniformly distributing said frothed mixture in an amount in the range of twenty grams per square foot to seventy grams per square foot over one surface of a urethane foam sheeting having a thickness in the range of one eighth of an inch to one inch and a density in the range of one pound per cubic foot to six pounds per cubic foot; and
   (c) heating said mixture to expand the plastic beads and to dry and cure the acrylic emulsion composition.

14. The method of claim 13 further comprised of the step of crushing the resulting material after said curing.

15. The method of claim 13 wherein the expandable plastic beads are expandable polystyrene beads.

16. The method of claim 15 in which said beads have a diameter of 0.75 to 1.2 millimeters.

17. A method of producing a flexible composite material for wall and ceiling covering and the like comprising the steps of:
   (a) providing a mixture of a curable frothable elastomeric emulsion composition and thermally expandable plastic beads having a diameter of about 0.5 to 2 millimeters, the mixture having proportions in the range of three pounds to twenty pounds of the expandable plastic beads to each one hundred pounds of elastomeric emulsion composition, frothed to a density in the range of one hundred forty grams per liter to two hundred sixty grams per liter;

(b) uniformly distributing said frothed mixture in an amount in the range of twenty grams per square foot to seventy grams per square foot over one surface of a urethane foam sheeting having a thickness in the range of one eighth of an inch to one inch and a density in the range of one pound per cubic foot to six pounds per cubic foot; and (c) heating said mixture to expand the plastic beads and to dry and cure the elastomeric emulsion composition to form a textured pebble-like elastomeric coating.

18. The method of claim 17 comprised of the further steps of providing a layer of curable elastomeric composition over the composite material formed in steps (a) through (c), and heating said layer to cure the elastomer.

19. The method of claim 17 in which said elastomeric coating is formed from an acrylic composition.

20. The method of claim 17 in which said elastomeric coating is formed from a styrene-butadiene composition.

21. The method of claim 17 in which said elastomeric coating is formed from a nitrile rubber composition.

22. The method of claim 17 in which said elastomeric coating is formed from a vinyl chloride-acrylic composition.

23. The method of claim 17 in which said elastomeric coating is formed from a vinylidene chloride-vinyl chloride composition.

24. The method of claim 17 in which said elastomeric coating is formed from a neoprene composition.

25. The method of claim 17 in which said elastomeric coating is formed from a natural rubber composition.

26. A method for producing a flexible composite material for wall and ceiling covering and the like comprising the steps of:

(a) providing a mixture of:
  (i) a curable frothable elastomeric emulsion composition based on an elastomer selected from the group consisting of acrylic polymers, styrene-butadiene copolymers; nitrile rubber; vinyl chloride-acrylic copolymers; vinylidene chloride-vinyl chloride copolymers; neoprene; and natural rubber, and
  (ii) thermally expandable polystyrene beads having a diameter in the range of approximately 0.5 millimeters to 2 millimeters; the mixture being in the proportions in the range of three pounds to twenty pounds of the expandable plastic beads to each one hundred pounds of elastomeric emulsion composition, frothed to a density in the range of one hundred forty grams per liter to two hundred sixty grams per liter;

(b) uniformly distributing the frothed mixture in an amount in the range of twenty grams per square foot to seventy grams per square foot over one surface of a urethane foam sheeting having a thickness in the range of one eighth of an inch to one inch and a density in the range of one pound per cubic foot to six pounds per cubic foot;

(c) heating the mixture to a temperature in the range of 200° F. to 325° F. to expand the plastic beads and to dry and cure the elastomeric emulsion composition to form a textured pebble-like elastomeric coating;

(d) providing a layer of uncured elastomeric composition, based on an elastomer selected from the group consisting of acrylic polymers, styrene-butadiene copolymers; nitrile rubber; vinyl chloride-acrylic copolymers; vinylidene chloride-vinyl chloride copolymers; neoprene; and natural rubber, on the material formed by steps (a) through (c); and (e) heating the layer provided in step (d) to a temperature in the range of 200° F. to 325° F. to cure the elastomeric composition.

27. The method of claim 26 wherein the elastomeric composition of step (d) and the elastomeric foam emulsion of step (a) are based on the same elastomeric species.

28. The method of claim 26 wherein the thermally expandable polystyrene plastic beads have a diameter in the approximate range of 0.7 to 1.2 millimeters.

29. A method of producing a flexible material having a textured surface comprising the steps of:

(a) providing a mixture of a curable frothed elastomeric composition and thermally expandable plastic beads, the expandable beads having a diameter of approximately 0.5 millimeters to 2 millimeters;

(b) uniformly distributing said mixture over one surface of a flexible foam sheet having a thickness of at least about one eighth of an inch; and (c) heating said mixture to expand the plastic beads and to dry and cure the elastomeric emulsion composition to form a textured pebble-like elastomeric coating.

30. The method of claim 29 wherein said foam sheet is a flexible urethane foam sheet.

31. A method of producing a flexible composite material for wall and ceiling covering and the like having a textured pebble-like elastomeric coating comprising the steps of:

(a) providing a mixture of a curable frothable water-based acrylic emulsion composition and thermally expandable polystyrene plastic beads having a diameter of about 0.5 to 2 millimeters, the mixture having proportions in the range of three pounds to twenty pounds of the expandable plastic beads to each one hundred pounds of acrylic emulsion composition, frothed to a density in the range of one hundred forty grams per liter to two hundred sixty grams per liter;

(b) uniformly distributing said frothed mixture in an amount in the range of twenty grams per square foot to seventy grams per square foot over one surface of a urethane foam sheeting having a thickness in the range of one eighth of an inch to one inch and a density in the range of one pound per cubic foot to six pounds per cubic foot;

(c) heating said mixture to a temperature in the range of 200° F. to 325° F. to expand the plastic beads and to dry and cure the acrylic emulsion composition;

(d) providing a layer of uncured acrylic emulsion composition over the layer formed in steps (a) through (c); and (e) heating the layer formed in step (d) to a temperature in the range of 200° F. to 325° F. to cure the elastomeric composition.

* * * * *